2,746,947

POLYMERIZATION OF VINYL ACETATE WITH PEROXIDE, AMINE, SULFINIC ACID CATALYST SYSTEM

Tsuguo Kominami and Junji Ukita, Toyama-shi, Japan, assignors of one-fourth to Omni Products Corporation, New York, N. Y., a corporation of New York No Drawing. Application February 19, 1953,
Serial No. 337,878

Claims priority, application Japan February 21, 1952,

6 Claims. (Cl. 260—89.1)

The invention relates to the block or solution polymerization of vinyl acetate.

A principal object of the invention is to provide a commercially useful method for the fast and continuous polymerization of vinyl acetate at a temperature below 50° C.

Another object of the invention is to provide a method which reduces the induction period at the start of the polymerization of vinyl acetate.

A still further object of the invention is to provide a polymerization method of vinyl acetate wherein the obtained polyvinyl acetate yields on saponification a polyvinyl alcohol of a higher polymerization degree than polyvinyl alcohol obtained by saponification of polyvinyl acetate produced by conventional methods.

It is well known that amines act as polymerization inhibitors for vinyl acetate, and for instance diphenyl amines have been used for this purpose in the distillation of vinyl acetate. On the other hand, it was also known that combinations of amines and peroxides catalyze the polymerization of vinyl acetate but good results were obtained with such catalyst mixtures not in block and solution polymerization (see G. S. Whitby et al., Ind. Eng. Chem., vol. 42, p. 445 (1950)). Other work in the polymerization field indicated that methacrylic acid ester could be polymerized in the presence of amines and peroxides, but that such catalyst mixtures were not effective in the polymerization of vinyl acetate (K. Noma, Chemistry of High Polymers of Japan, vol. 6, p. 479 (1949)).

It is further known that mixtures of peroxide and sulfinic acid catalyze the polymerization of vinyl acetate (Jap. Pat. No. 194,942). In a thorough investigation of the conditions controlling the polymerization of vinyl acetate, we have found that a very fast polymerization in homogeneous liquid phase is obtained by using catalyst mixtures of sulfinic acid, amine, and peroxide.

As sulfinic acids, benzene sulfinic acid, p-toluene sulfinic acid and p-chlorobenzene sulfinic acid are particularly effective. The sulfinic acid cannot be replaced by other reducing agents, such as benzoine, which are ordinarily effective in redox polymerization.

Primary amines, for instance p-phenylene diamine, alpha naphthylamine or ethylene diamine, as well as secondary amines such as diphenylamine, carbazol, and N,N' diphenylbenzidine, or tertiary amines such as dimethyl aniline may be used. The catalytic efficacy of the amines is in the order tertiary amine, secondary amine, primary amine, that is, the tertiary amines are the most efficient catalysts. The optimum mole ratio of amine to benzoyl peroxide is 0.1 mole of primary and secondary amine and 1 mole of tertiary amine to 1 mole of benzoyl peroxide. However, mole ratios of 1 to 0.03 mole of primary and secondary amine and 2 to 0.1 mole of tertiary amine to 1 mole of benzoyl peroxide are sufficiently effective.

With respect to sulfinic acid, equimolar amounts of sulfinic acid and peroxide are most effective. When using catalyst mixtures of benzoyl peroxide, sulfinic acid, and amine, not only the rate of polymerization of the vinyl acetate is increased but also the induction period preceding the polymerization is considerably shortened. This is an important advantage of our novel catalyst mixture for the commercial polymerization and makes it possible to carry out the polymerization in a continuous procedure. Heretofore, large amounts of catalysts had to be used to shorten the induction period, which in turn increased the polymerization rate to such a degree that a control of the process became difficult.

A further important advantage of our method is that the obtained polyvinyl acetate has a relatively small degree of polymerization ($P_{AC}$) but yields a polyvinyl alcohol of relatively large polymerization degree ($P_A$). Usually, polyvinyl acetate contains branched chains developed by branching reactions during the polymerization, and said branched portions split off on saponification to polyvinyl alcohol. Therefore, the polymerization degree of polyvinyl alcohol is usually small in comparison with that of the polyvinyl acetate from which it is obtained.

The relationship between the polymerization degrees of polyvinyl acetate, and polyvinyl alcohol obtained therefrom, may be defined by the equation $$\frac{P_{AC}}{P_A} - 1 = K \cdot P_{AC}$$

wherein K is a constant showing the decrease of the polymerization degree on saponification and is a function of the polymerization conditions. When making polyvinyl acetate for the production of polyvinyl alcohol, it is preferable to prepare a polyvinyl acetate giving a value of K as small as possible, in order to provide for a smooth polymerization and saponification. Polyvinyl acetate prepared with conventional peroxide catalysts has a K of about $2-3 \times 10^{-4}$; polyvinyl acetate prepared with the novel catalyst mixture has a K of only $1-2 \times 10^{-4}$. The small value of K is evidence that the polyvinyl acetate obtained according to the invention is very little branched and has substantially the form of a chain which explains its superior qualities for the preparation of polyvinyl alcohol.

If a small amount of an iron salt is added to the catalyst mixture of amine, peroxide and sulfinic acid, the induction period is further shortened and the polymerization degree of the polyvinyl acetate is further decreased. An addition of $\frac{1}{20}$ mole of iron salt per 1 mole of peroxide is sufficient. We prefer to add only $\frac{1}{120}$ to $\frac{1}{1000}$ mole of the iron salt per mole of peroxide.

Example 1

This example is given to illustrate the effect of the addition of sulfinic acid to catalyst mixtures composed of amine and peroxide used for polymerizing a liquid mixture containing 70 per cent of vinyl acetate and 30 per cent of methanol.

| Benzoyl peroxide, percent | Diphenyl amine, percent | p-chloro benzene sulfinic acid, percent | Temp., ° C. | Induction period in hours | Polym. period in hrs. (not including ind. period), hours | Polym. yield, percent |
|---|---|---|---|---|---|---|
| 0.2 | 0 | 0 | 60 | 3 | 5 | 80 |
| 0.2 | 0 | 0 | 40 | 13 | 15 | 50 |
| 0.2 | ----- | 0.15 | 40 | 4 | 10 | 70 |
| 0.2 | 0.01 | ----- | 40 | (¹) | (¹) | (¹) |
| 0.2 | 0.01 | 0.15 | 40 | 0.5 | 6 | 80 |

¹ No polymerization.

The table shows that benzoyl peroxide alone is not useful as a catalyst for the commercial polymerization of vinyl acetate at 40° C. because of the long induction period. Addition of sulfinic acid shortens the induction period but the effect is still insufficient. A catalytic mixture of benzoyl peroxide and amine does not produce any polymerization. However, with a tertiary system of benzoyl peroxide, amine and sulfinic acid, the induction period is only 30 minutes and 80% polymerization is obtained within 6 hours.

*Example 2*

This example illustrates the influence of an addition of amine on the induction period.

The polymerization conditions were: Vinyl acetate: 85%, methanol: 15%, p-chlorobenzene sulfinic acid: 0.15%, benzoyl peroxide: 0.2%, polymerization temperature: 40° C.

| Amount of dimethyl aniline, per cent: | Induction period min. |
|---|---|
| 0 | 270 |
| 0.01 | 77 |
| 0.025 | 27 |
| 0.05 | 14 |
| 0.1 | 7 |

*Example 3*

To a liquid mixture containing 85 per cent of vinyl acetate and 15 per cent of methanol were added:

| | Per cent |
|---|---|
| Alpha-naphthylamine | 0.038 |
| Benzoyl peroxide | 0.2 |
| p-Chlorobenzene sulfinic acid | 0.15 |

After polymerization at 40° C. for 6½ hours, a yield of 51 per cent of polyvinyl acetate was obtained.

*Example 4*

Under the reaction conditions set forth in Example 3, alpha naphthylamine was replaced by 0.079% of dimethyl aniline, or 0.025% of tetraphenyl hydrazine, respectively. In the first case, vinyl acetate was obtained in 88% yield within two hours, and in the second case the same yield was obtained within 6 hours.

*Example 5*

To a liquid mixture containing 70% of vinyl acetate and 30% of methanol were added:

| | Per cent |
|---|---|
| Dimethyl aniline | 0.1 |
| Benzoyl peroxide | 0.2 |
| p-Chlorobenzene sulfinic acid | 0.3 |

The mixture was heated at 40° C., whereby the polymerization started after 10 minutes. After 4 hours, the yield of polyvinyl acetate was 94%. The polymerization of this polyvinyl acetate was 1423, and the polymerization degree of the polyvinyl alcohol obtained therefrom by saponification was 1202;

$$K = \frac{1}{P_A} - \frac{1}{P_{AC}}$$

is therefore only $1.2 \times 10^{-4}$.

The polymerization degree was calculated by the following formula from the intrinsic viscosity ($\eta$) in acetone and water.

Polyvinyl acetate: ($\eta$) 30° C. = $6.98 \times 10^{-4} \bar{P}_{AC}$ 0.62

Polyvinyl alcohol: ($\eta$) 30° C. = $8.33 \times 10^{-4} \bar{P}_A$ 0.62

If the same mixture with 2% of benzoyl peroxide only as catalyst was polymerized at 60° C. for 8 hours, the yield of polyvinyl acetate was 80% and the polymerization degree of the polyvinyl acetate 1520; the polymerization degree of the polyvinyl alcohol obtained therefrom by saponification was 1030. Therefore, $$K = 2.6 \times 10^{-4}$$

*Example 6*

0.01% of alpha naphthylamine as primary amine, 0.2% of benzoyl peroxide, and 0.15% of p-chlorobenzene sulfinic acid were added to a liquid mixture of 95% of vinyl acetate and 5% of methanol, and the mixture was polymerized at 40° C. for 4 hours until 80% polymerization was obtained. The polymerization degree of the obtained polyvinyl acetate was 4300, and the polymerization degree of the polyvinyl alcohol obtained therefrom was 2500. In this case, the most suitable mole ratio of amine to benzoyl peroxide was about 0.1:1.

*Example 7*

0.01% of diphenylamine as a secondary amine, 0.2% of benzoyl peroxide and p-chlorobenzene sulfinic acid were added to a liquid mixture of 85% of vinyl acetate and 15% of methanol. The mixture was polymerized at 40° C. to reach 80% polymerization yield after 6 hours. The polymerization degree of the obtained polyvinyl acetate was 1778, and that of the polyvinyl alcohol obtained therefrom was 1540. The most suitable mole ratio of diphenylamine to benzoyl peroxide in this case was 0.1:1.

*Example 8*

A liquid mixture containing 70% of vinyl acetate and 30% of methanol was polymerized with addition of 0.1% of dimethyl aniline as a tertiary amine, 0.2% of benzoyl peroxide and 0.15% of p-chlorobenzene sulfinic acid. The reaction was carried out at 40° C., and the polymerization started after 10 minutes and produced a yield of 95% of polymer after 4 hours. The same result was obtained when the amount of sulfinic acid was increased to 0.3%. The polymerization degree of the polyvinyl alcohol obtained from the polyvinyl acetate was 1220. In this case, the most suitable mole ratio of dimethyl aniline, benzoyl peroxide, and sulfinic acid was 1:1:1.

*Example 9*

The liquid mixture to be polymerized consisted of 85% of vinyl acetate and 15% of methanol, and 0.1% of dimethyl aniline, 0.2% of benzoyl peroxide and 0.13% of p-toluene sulfinic acid were added thereto. At a polymerization temperature of 40° C., 94% polymerization was obtained within 2½ hours. The polymerization degree of the polyvinyl acetate was 2050, that of the polyvinyl alcohol obtained therefrom 1450.

*Example 10*

Varying amounts of FeCl₂·4H₂O were added to a polymerization mixture consisting of 85% of vinyl acetate and 15% of methanol and containing as catalysts 0.02% of diphenylamine, 0.2% of benzoyl peroxide and 0.14% of p-chlorobenzene sulfinic acid. The polymerization was carried out at 40° C.; the results are given in the following table:

| $FeCl_3$ (containing crystal water) | Induction period in min. | Polymerization period in hrs. | Yield, percent | $\bar{P}_{AC}$ | $\bar{P}_A$ |
|---|---|---|---|---|---|
| 0 | 33 | 3 | 62 | 3,880 | 1,820 |
| 0.0003% | 12 | 3 | 65 | 2,570 | 2,040 |
| 0.0006% | 5 | 3 | 70 | 2,540 | 1,860 |

The polymerization proper was not influenced by the addition of the iron salt but the induction period was shortened. 0.003 to 0.001% of ferrous chloride crystals were the most suitable amount of addition; larger amounts exceeding 0.002% did not improve the effect.

What we claim is:

1. The process which comprises polymerizing vinyl acetate in homogeneous liquid phase in the presence of a catalyst mixture containing a peroxide, an amine, and an aromatic sulfinic acid.

2. The process which comprises polymerizing vinyl acetate in homogeneous liquid phase in the presence of a catalyst mixture containing a peroxide, an aromatic sulfinic acid, and a tertiary amine in an amount of 0.1 to 2 moles per mole of the peroxide catalyst.

3. The process which comprises polymerizing vinyl acetate in homogeneous liquid phase in the presence of a catalyst mixture containing a peroxide, an aromatic sulfinic acid, and a secondary amine in an amount of 0.003 to 1 mole per mole of the peroxide catalyst.

4. The process which comprises polymerizing vinyl acetate in homogeneous liquid phase at a temperature below 50° C. in the presence of a tertiary catalyst mixture consisting of substantially equimolar amounts of benzoyl peroxide and p-chlorobenzene sulfinic acid, and a member of the group consisting of tertiary amines and secondary amines.

5. The process which comprises polymerizing vinyl acetate in homogeneous liquid phase in the presence of a quaternary catalyst system, said catalyst system consisting of a peroxide catalyst, an amine, an aromatic sulfinic acid, and an iron salt.

6. The process which comprises polymerizing vinyl acetate in homogeneous liquid phase in the presence of a quaternary catalyst system, said catalyst system consisting, based on the weight of the liquid phase, of about 0.2 per cent of an organic peroxide catalyst, about 0.13 to 0.3 per cent of an amine, about 0.0003 to 0.002 per cent of an iron salt, and about 0.14 to 0.3 per cent of an aromatic sulfinic acid.

References Cited in the file of this patent

UNITED STATES PATENTS

| | | |
|---|---|---|
| 2,444,643 | Fryling | July 6, 1948 |
| 2,519,135 | Jacobson | Aug. 15, 1950 |
| 2,610,965 | Vandenberg | Sept. 16, 1952 |

OTHER REFERENCES

Berg A. P. C. Serial No. 337,552, published April 20, 1943.